United States Patent
Cohn et al.

(10) Patent No.: US 6,199,747 B1
(45) Date of Patent: Mar. 13, 2001

(54) HIGH TEMPERATURE REFRACTORY JOINING PASTE

(75) Inventors: Michael A. Cohn, Ramsey, NJ (US); Joseph P. DeGeorge, Wappingers Falls; Rao V. Vallabhaneni, Hopewell Junction, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,932

(22) Filed: Aug. 30, 1999

(51) Int. Cl.$^7$ .............................. B23K 31/12; B23K 20/00
(52) U.S. Cl. .................. 228/119; 228/248.1; 228/262.8; 228/194; 228/119
(58) Field of Search ..................................... 228/119, 194, 228/195, 248.1, 262.8; 428/550

(56) References Cited

U.S. PATENT DOCUMENTS

| | | |
|---|---|---|
| 3,170,234 * | 2/1965 | Tarr et al. . |
| 3,197,858 * | 8/1965 | Feduska et al. . |
| 3,259,971 * | 7/1966 | Gagola et al. . |
| 3,650,707 * | 3/1972 | Duff et al. . |
| 3,714,702 * | 2/1973 | Hammond . |
| 3,716,347 * | 2/1973 | Bergstrom et al. . |
| 3,909,917 * | 10/1975 | Lebedev et al. . |
| 3,969,126 | 7/1976 | Anderson . |
| 4,005,988 | 2/1977 | Paulonis et al. . |
| 4,008,884 | 2/1977 | Fitzpatrick et al. . |
| 4,038,041 * | 7/1977 | Duvall et al. . |
| 4,276,493 | 6/1981 | Srinivasa et al. . |
| 4,362,582 * | 12/1982 | Danko . |
| 4,700,881 | 10/1987 | Ryan . |
| 4,736,883 * | 4/1988 | Morgan et al. . |
| 5,038,996 | 8/1991 | Wilcox et al. . |
| 5,234,152 | 8/1993 | Glaeser . |
| 5,240,491 | 8/1993 | Budinger et al. . |
| 5,352,385 | 10/1994 | Yanagida et al. . |
| 5,378,673 | 1/1995 | Reynolds et al. . |
| 5,639,322 | 6/1997 | Okuda et al. . |
| 5,806,751 | 9/1998 | Schaefer et al. . |

* cited by examiner

*Primary Examiner*—Patrick Ryan
*Assistant Examiner*—Jonathan Johnson
(74) *Attorney, Agent, or Firm*—DeLio & Peterson LLC; Peter W. Peterson; Ira D. Blecker

(57) ABSTRACT

A method of and novel composition for transient liquid phase bonding of refractory metal structures is described herein. Preferably, the composition comprises a first component substantially similar to the composition of the refractory metal structure, and a second component having a lower melting temperature than the first component comprising a metallic constituent selected from the group consisting of iron, nickel and cobalt. The second component acts as a melting point depressant to temporarily lower the melting point of the first component so that the join can be accomplished without melting the structure itself. Upon applying the composition to the surfaces of refractory metal structures in need of joining, the assembly is heated to a eutectic point defined as the lowest melting point of the composition. A localized liquid region is formed at the interface of the two structures which solidifies when the second component diffuses into the structures such that the region becomes increasingly refractory thereby solidifying into a substantially refractory joint.

33 Claims, 1 Drawing Sheet

HIGH TEMPERATURE REFRACTORY JOINING PASTE

BACKGROUND OF THE INVENTION

1. Field of the Invention

This invention relates to a method of and novel composition for use in joining refractory metal structures, and, more particularly, to the transient liquid phase bonding of such refractory metal structures.

2. Description of Related Art

Refractory metal structures may be employed as support structures in high temperature sintering furnaces known as sintering furniture or hardware. Oftentimes, the sintering furniture is made from molybdenum to withstand operating temperatures of up to 1700° C. Occasionally, the sintering furniture breaks and must be repaired or discarded. Attempts at cost containment have led to methods of repairing the sintering furniture. Most preferably, repairing the sintering furniture achieves a defect free bond joint having a strength comparable to that of the sintering furniture itself.

Typically, repairs have been made by mechanically joining the broken pieces together. The mechanical joining process may comprise forming nubs on the one surface of the broken piece of sintering furniture and press fitting the nub into a drilled hole of the corresponding piece of furniture. However, due to the expansion and contraction of the pieces during thermal cycling of the furnace, the mechanical joint would fail. Thus, it would be desirable to join the broken pieces in a manner which is capable of sustaining the repeated thermal cycling of the furnace. A preferred manner of joining the structures would be a sintered joint which can withstand the thermal cycling and does not re-soften at the operating temperature of the furnace.

Transient liquid phase bonding has proven to be a very useful method in producing high quality bonds in high temperature metals. In transient liquid phase bonding, different metals of a eutectic system are deposited on the surfaces of the article to be bonded. It is desirable to find the system which produces a high quality joint while excluding from the interlayer alloy those elements which may adversely effect the bonding process or the quality of the resulting joint.

Bearing in mind the problems and deficiencies of the prior art, it is therefore an object of the present invention to provide a method for joining refractory metal structures which provides a joint capable of withstanding repeated thermal cycling at extreme temperatures.

It is another object of the present invention to provide a method for joining molybdenum sintering furniture which provides a sintered joint capable of withstanding the repeated thermal cycling at extreme temperatures while not prone to re-melting or re-softening.

A further object of the invention is to provide a novel eutectic system for transient liquid phase bonding of refractory metal structures wherein the resulting joint does not contain elements which would substantially affect the bonding process or the quality of the joint.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of joining refractory metal components comprising the steps of: (a) providing a first refractory metal component and a second refractory metal component, the first and second refractory metal components having corresponding surfaces in need of joining; (b) providing a joining paste mixture comprising a binder mixture, a refractory material, and a material having a lower melting point than the refractory material; (c) applying the paste mixture to the surface in need of joining on the first refractory metal component and to the surface in need of joining on the second refractory metal component; (d) contacting the first refractory metal component to the second refractory metal component at the surfaces in need of joining to form a joined structure; (e) heating the joined structure to a eutectic point of the paste mixture; and (f) forming a substantially refractory joint between the first and second refractory metal components.

Preferably, step (b) comprises providing a joining paste mixture comprising a binder mixture, a refractory material, the refractory material present in an amount of about 95.0 to about 99.8 wt. %, and a material having a lower melting point than the refractory material present in an amount of about 0.2 to about 5.0 wt. % based on a total weight of the refractory material and the material having a lower melting point than the refractory material.

Preferably, during step (e) the material having a lower melting point than the refractory material forms a localized liquid region with the refractory material at the surfaces in need of joining wherein the material having a lower melting point than the refractory material diffuses into the refractory metal components and into the refractory material of the paste. Preferably, during step (f) the material having a lower melting point than the refractory material diffuses into the refractory metal components forming a solid joint as the localized liquid region decreases its concentration of the material having a lower melting point than the refractory material thereby becoming more refractory.

In another aspect, the present invention is directed to a method of repairing molybdenum sintering furniture comprising the steps of: (a) providing a first piece of sintering furniture and a second piece of sintering furniture having corresponding surfaces in need of joining; (b) providing a metal paste mixture comprising an organic binder mixture, about 80.0 to about 85.0 wt. % molybdenum and about 0.5 to about 5 wt. % iron based on a total weight of the paste mixture; (c) applying a layer of the paste mixture to the surfaces in need of joining on the first and second pieces of the sintering furniture; (d) contacting the pieces to be joined at its surfaces having the paste mixture to form a joined piece; (e) heating the joined piece; and (f) forming a substantially refractory joint between the first and second pieces of sintering furniture.

In yet another aspect, the present invention is directed to a method of repairing tungsten sintering furniture comprising the steps of: (a) providing a first piece of sintering furniture and a second piece of sintering furniture having corresponding surfaces in need of joining; (b) providing a metal paste mixture comprising an organic binder mixture, about 95.0 to about 99.8 wt. % tungsten, and about 0.2 to about 5.0 wt. % of a material selected from the group consisting of iron, nickel and cobalt based on a total weight of the tungsten and the material selected from the group consisting of iron, nickel and cobalt, and; (c) applying a layer of the paste mixture to the surfaces in need of joining on the first and second pieces of the sintering furniture; (d) contacting the pieces to be joined at its surfaces having the paste mixture to form a joined piece; (e) heating the joined piece; and (f) forming a substantially refractory joint between the first and second pieces of sintering furniture.

In still yet another aspect, the present invention is directed to a paste mixture for joining of refractory materials comprising a first component comprising a refractory material having a particle size of about 1.5 to about 3.0 $\mu$m; a second component having a lower melting point than the first component and a particle size wherein at least about 50% of a total number of particles are less than about 3 to about 6 $\mu$m; and an organic binder mixture. Preferably, the first component is present in an amount of about 80 to about 85 wt. % of a total weight of the paste. Preferably, the second component is present in an amount of about 0.2 to about 5 wt. % of a total weight of the first and second components. Preferably, the first component comprises molybdenum or tungsten, and the second component is selected from the group consisting of iron, nickel, and cobalt.

In a further aspect, the present invention is directed to a metal joining paste mixture for repairing molybdenum sintering furniture comprising about 80 to about 85 wt. % molybdenum; about 0.2 to about 5 wt. % iron; and about 10.0 to about 19.8 wt. % of an organic binder mixture. Preferably, the molybdenum has a particle size of about 1.5 to about 3.0 $\mu$m and the iron has a particle size wherein at least about 50% of a total number of particles are less than about 3 to about 6 $\mu$m. The metal joining paste mixture is adapted to be applied to corresponding surfaces of molybdenum sintering furniture and contacted together, heated to a eutectic point of the paste mixture forming a localized liquid region at the interface of the corresponding surfaces, and upon diffusion of the material into the molybdenum sintering furniture, the localized liquid region becomes more refractory thereby solidifying into a solid joint.

In a final aspect, the present invention is directed to a metal joining paste mixture for repairing tungsten sintering furniture comprising about 95.0 to about 99.8 wt. % tungsten; about 0.2 to about 5.0 wt. % of a material selected from the group consisting of iron, nickel and cobalt based on a total weight of the tungsten and the material; and an organic binder mixture. Preferably, the tungsten has a particle size of about 0.7 to about 1.5 $\mu$m and the material selected from the group consisting of iron, nickel and cobalt has a particle size wherein at least about 50% of the particles are less than about 3 to about 6 $\mu$m. The metal joining paste mixture is adapted to be applied to corresponding surfaces of tungsten sintering furniture and contacted together, heated to a eutectic point of the paste mixture forming a localized liquid region at the interface of the corresponding surfaces, and upon diffusion of the material into the tungsten sintering furniture, the localized liquid region becomes more refractory thereby solidifying into a solid joint.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 2:
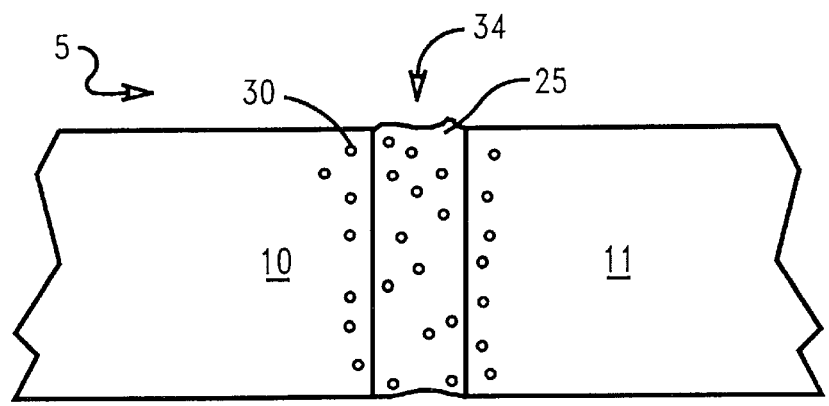
FIG. 2 is a cross-section of the assembly shown in FIG. 1 wherein a localized liquid region is formed between the two refractory structures.
Figure 3:
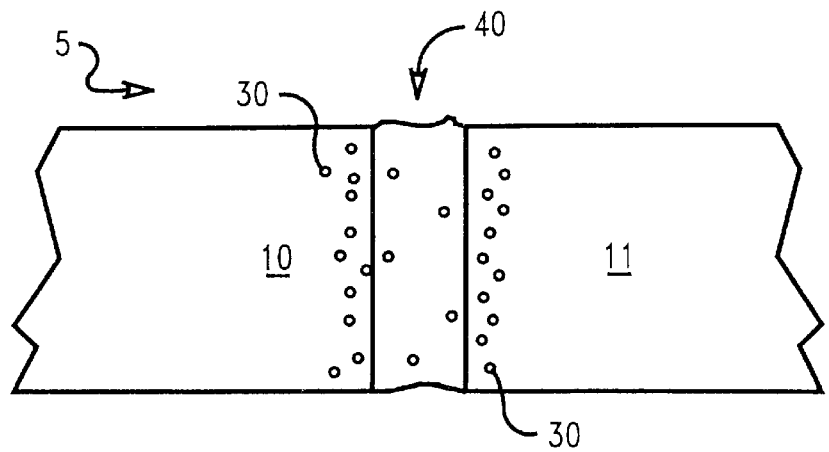
FIG. 3 is a cross-section of the assembly shown in FIG. 1 wherein the localized liquid region has solidified to a substantially refractory joint.

In describing the preferred embodiment of the present invention, reference will be made herein to FIGS. 1–3 of the drawings in which like numerals refer to like features of the invention. Features of the invention are not necessarily shown to scale in the drawings.

The present invention relates to the bonding of refractory metal structures such as sintering furniture or hardware by use of a refractory metal paste having metallic constituents wherein the resultant joint maintains the structural integrity of the refractory metal structures at the high operating temperatures of the structures. Preferably, the refractory metal paste comprises a first component substantially similar to the composition of the refractory metal structure, and a second component having a lower melting temperature than the first component comprising a metallic constituent selected from the group consisting of iron, nickel and cobalt. The second component acts as a melting point depressant to temporarily lower the melting point of the first component so that the join can be accomplished without melting the structure itself. Formation of a sintered joint occurs as a result of transient liquid phase bonding. The sintered joint provides advantages over the prior art mechanical joints which cannot tolerate the thermal cycling of the service temperatures of the structures as well as a sintered joint.

In repairing refractory metal structures in accordance with the present invention, the novel joining paste used comprises a two component eutectic system: a material substantially similar to the refractory metal structure, and a metallic constituent. Sintering furniture or hardware comprises refractory metals such as molybdenum or tungsten. Thus, a first component is preferably a similar refractory material such as molybdenum or tungsten. The refractory material is preferably present in an amount of about 95.0 to about 99.8 wt. % based on the total weight of the eutectic system. In preparing a molybdenum based joining paste, the molybdenum powder has a particle size of about 1.5 to about 3.0 $\mu$m Fisher Sub-sieve size (FSSS), preferably about 2.3 to about 2.8 $\mu$m FSSS, and most preferably about 2.55$\mu$ FSSS. When preparing a tungsten based joining paste, the tungsten powder has a finer particle size than the molybdenum. Preferably, the tungsten powder has a particle size of about 0.7 to about 1.5 $\mu$m FSSS, most preferably about 0.1 $\mu$m FSSS.

The second component of the joining paste preferably comprises a material selected from the group consisting of iron, nickel and cobalt. The second component is preferably present in an amount of about 0.2 to about 5.0 wt. % based on the total weight of the paste mixture. The second component has a particle size distribution, as measured by an SPA Microtrac™, wherein at least about 50% of the total number of particles are less than about 3 to about 6 $\mu$m, preferably wherein 50% of the particles are less than about 4 to about 5 $\mu$m. Most preferably, the particle size of the second component is distributed as about 10% of the particles being less than 1.9 $\mu$m, 50% of the particles being less than about 4.5 $\mu$m and 90% of the particles being less than 8.7 $\mu$m. Wherein the first component comprises molybdenum, the second component is preferably iron present in an amount of about 0.5 to about 3.5 wt. %, most preferably about 1.5 to about 1.7 wt. % based on a total weight of the paste. Wherein the first component comprises tungsten, the second component is preferably iron present in an amount of about 0.2 to about 5.0 wt. %. Generally, when using nickel or cobalt as the second component, slightly higher concentrations of these metal constituents are required in the paste, preferably towards the higher end of the aforementioned range.

The presence of the second component reduces the melting and sintering temperature of the refractory metal powder of the first component allowing for a lower melting or sintering temperature of the refractory metal powder at the surfaces of the refractory metal structures to be joined.

Additionally, the joining paste further comprises organics present in an amount of about 12.0 to about 24.0 wt. % based on a total weight of the paste such that a paste is formed with the refractory metal powder and the metallic constituent. The organic binder mixture may include one or more surfactants such as oleoyl sarcosine; a Theological modifier; an organic solvent, e.g., 2,2,4-trimethylpentanediol-1,3-monoisobutyrate; and a polymeric binder, e.g. ethylcellulose. The surfactant may be present in an amount of about 0.5 to about 1.5 wt. %. The rheological modifier may be present in an amount of about 0.3 to about 1.5 wt. %. The solvent may be present in an amount of about 12.0 to about 20.0 wt. %. The polymeric binder to solvent ratio may vary from about 9:91 to about 3:22.

The joining paste is preferably prepared by intimately mixing the desired amounts of the refractory metal powder and the metallic constituent along with the organics in a planetary mixer and then milled on a 3 roll mill to wet, deagglomerate and disperse the solids uniformly into the organic binder mixture. The resulting joining paste has a preferred viscosity range of about 20 to about 50 Pascal-seconds at about 160 reciprocal seconds. An example of a preferred paste composition due to its demonstrated effectiveness in joining refractory metal structures, particularly those made of molybdenum or tungsten, comprises 84.5 wt. % molybdenum, 1.5 wt. % iron, 1.0 wt. % surfactant, 0.6 wt. % Theological modifier, 1.4 wt. % ethylcellulose binder and 11.0 wt. % of solvent based on a total weight of the paste.

In accordance with the present invention, two or more pieces of a refractory metal structure may be joined by using the aforementioned novel joining paste. Since molybdenum sintering furniture is well known and widely used in sintering processes, the following methodology is discussed using molybdenum sintering furniture merely as an example although other refractory metal structures may be repaired utilizing the method of the present invention.

Preferably, when joining pieces of a molybdenum article, the joining paste is applied as a thin layer to the surfaces of a first piece of molybdenum sintering furniture and a second piece of molybdenum sintering furniture to join the pieces to one another. The layer of joining paste is preferably about 5 to about 50 μm thick depending on the size of the sintering furniture and is applied using any appropriate conventional means. Preferably, the ends of the sintering furniture should be machined to create a smooth surface in preparation for the joint. The two surfaces are contacted together and the resulting assembly is dried to remove the solvent present in the organics portion of the paste.

Figure 1:
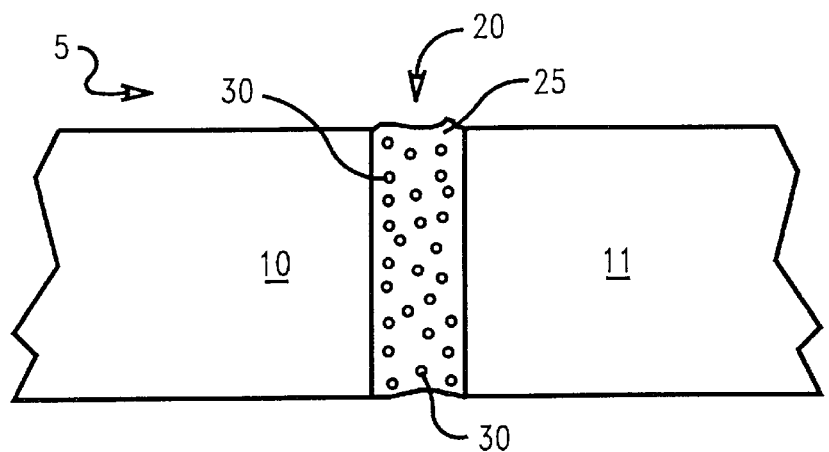
FIG. 1 is a cross-section of an assembly of two refractory metal structures in the process of being joined in accordance with a method of the present invention.

FIG. 1 is a schematic illustration of a cross-section of a refractory metal assembly 5 after the solvent has been driven off. The assembly 5 comprises a first piece of sintering furniture 10 in intimate contact with the second piece of sintering furniture 11. The joining paste 20 preferably comprises, as the first component 25, a refractory material, in this example being molybdenum, and the second component 30 comprising iron as the metallic constituent.

Once assembly 5 has been dried to remove any solvent in paste 20, it is placed into a reducing atmosphere furnace and heated to at least the eutectic point of the paste mixture. The eutectic point is defined as the lowest melting point obtainable from the combination of the components in the paste mixture. In this example, the assembly is heated to the eutectic point of the iron-molybdenum paste mixture of approximately 1450° C. The heating continues for about 1 to 3 hours during which the components react with the sintering furniture at the joined interface. As shown in FIG. 2, a localized liquid region 34 is formed at the joined interface during heating at the eutectic point of the paste components. The melting point of molybdenum is approximately 2600° C. such that during heating in the furnace, the sintering furniture does not soften or melt. As the localized liquid region is formed, its composition changes becoming richer in the first component 25, molybdenum.

Upon continued heating, the second component 30, the iron metallic constituent, diffuses out of region 34 and into the sintering furniture 10 and 11 as an interlayer alloy is created at the joined interface. Consequently, the iron substantially diffuses out of the region 34 and into sintering furniture 10 and 11 such that the resulting joint 40, as seen in FIG. 3, is a substantially refractory joint. When region 34 becomes sufficiently rich in the first component 25, the region solidifies into a solid joint 40. Joint 40 does not soften at the service temperature of the sintering furniture although there may be traces of the second component 30 remaining in the joint.

The present invention achieves the objects recited above. The refractory joint produced in accordance with the present invention is capable of withstanding the repeated thermal cycling at extreme temperatures without re-softening or re-melting. The novel paste composition of the present invention provides for successful transient liquid phase bonding of refractory metal structures. A substantially refractory joint is formed due to the diffusion of the small amount of the metallic constituent component of the paste into the structures itself and into the refractory material of the paste. Such joints are superior to prior art mechanical joints which cannot withstand the repeated thermal cycling of the structures during its service life.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of joining refractory metal components comprising the steps of:
   (a) providing a first refractory metal component and a second refractory metal component, said first and second refractory metal components having corresponding surfaces in need of joining;
   (b) providing a joining paste mixture comprising a refractory material present in an amount between 95.0 wt. % and 99.8 wt. % and a material having a lower melting point than the refractory material present in an amount between 0.2 wt. % and 5.0 wt. % based on a total weight of said refractory material and the material having a lower melting point than the refractory material, and a binder mixture;

(c) applying said paste mixture to the surface in need of joining on said first refractory metal component and to the surface in need of joining on said second refractory metal component;

(d) contacting said first refractory metal component to said second refractory metal component at the surfaces in need of joining to form a joined structure;

(e) heating the joined structure to a eutectic point of said paste mixture; and (f) forming a substantially refractory joint between said first and second refractory metal components.

2. The method of claim 1 wherein in step (a) said refractory metal components comprise molybdenum and in step (b) said paste mixture comprises tungsten and a material selected from the group consisting of iron, nickel and cobalt.

3. The method of claim 1 wherein in step (a) said refractory metal components comprise molybdenum and in step (b) said paste mixture comprises molybdenum and a material selected from the group consisting of iron, nickel and cobalt.

4. The method of claim 3 wherein in step (b) the molybdenum has a particle size of about 1.5 to about 3.0 $\mu$m, and the material selected from the group consisting of iron, nickel and cobalt has a particle size wherein at least about 50% of a total number of particles are less than about 3 to about 6 $\mu$m.

5. The method of claim 1 wherein in step (a) said refractory metal components comprise tungsten and in step (b) said paste mixture comprises molybdenum and a material selected from the group consisting of iron, nickel and cobalt.

6. The method of claim 1 wherein in step (a) said refractory metal components comprise tungsten and in step (b) said paste mixture comprises tungsten and a material selected from the group consisting of iron, nickel and cobalt.

7. The method of claim 6 wherein in step (b) the tungsten has a particle size of about 0.7 to about 1.5 $\mu$m, and the material selected from the group consisting of iron, nickel and cobalt has a particle size wherein at least about 50% of a total number of particles are less than about 3 to about 6 $\mu$m.

8. The method of claim 1 wherein step (c) comprises applying a layer of said paste mixture having a thickness of about 5 to about 50 $\mu$m to the surface in need of joining of said first refractory metal component and to the surface in need of joining on said second refractory metal component.

9. The method of claim 1 wherein during step (e) the material having a lower melting point than the refractory material forms a localized liquid region with the refractory material at the surfaces in need of joining.

10. The method of claim 1 wherein during step (f) the material having a lower melting point than the refractory material diffuses into said refractory metal components forming a solid joint as the localized liquid region decreases its composition of the material having a lower melting point than the refractory material thereby becoming more refractory.

11. The method of claim 1 wherein in step (b) said joining paste mixture comprising said refractory material having a particle size ranging from about 0.7 to about 3.0 $\mu$m, while said material having a lower melting point than said refractory material having a particle size wherein at least about 50% of a total number of particles are less than about 3 to about 6 $\mu$m.

12. The method of claim 11 wherein in step (b) said joining paste mixture comprising said refractory material having a particle size ranging from about 0.7 to about 3.0 $\mu$m, while said material having a lower melting point than said refractory material selected from the group consisting of iron, nickel and cobalt having a particle size wherein at least about 50% of a total number of particles are less than about 3 to about 6 $\mu$m.

13. A method of repairing molybdenum sintering furniture comprising the steps of:

(a) providing a first piece of sintering furniture and a second piece of sintering furniture having corresponding surfaces in need of joining;

(b) providing a metal paste mixture comprising an organic binder mixture, and between 80.0 wt. % and 85.0 wt. % molybdenum and between 0.5 wt. % and 5 wt. % iron based on a total weight of said paste mixture;

(c) applying a layer of said paste mixture to the surfaces in need of joining on said first and second pieces of said sintering furniture;

(d) contacting said pieces to be joined by its surfaces having said paste mixture to form a joined piece;

(e) heating the joined piece; and (f) forming a substantially refractory joint between said first and second pieces of sintering furniture.

14. The method of claim 13 wherein during step (e) the organic binder mixture in said paste mixture substantially burns off.

15. The method of claim 13 wherein during step (e) said paste mixture forms an iron-molybdenum alloy.

16. The method of claim 13 wherein step (e) comprises heating the joined piece to a eutectic point such that a localized liquid region is formed at an interface of the joined pieces.

17. The method of claim 13 wherein during step (f) the iron diffuses into said sintering furniture forming a solid joint as the localized liquid region decreases its composition of the iron thereby becoming more refractory.

18. A method of repairing tungsten sintering furniture comprising the steps of:

(a) providing a first piece of sintering furniture and a second piece of sintering furniture having corresponding surfaces in need of joining;

(b) providing a metal paste mixture comprising an organic binder mixture, and between 95.0 wt. % and 99.8 wt. % tungsten and between 0.2 wt. % and 5.0 wt. % of a material selected from the group consisting of iron, nickel and cobalt based on a total weight of the tungsten and the material selected from the group consisting of iron, nickel and cobalt;

(c) applying a layer of said paste mixture to the surfaces in need of joining on said first and second pieces of said sintering furniture;

(d) contacting said pieces to be joined at its surfaces having said paste mixture to form a joined piece;

(e) heating the joined piece; and (f) forming a substantially refractory joint between said first and second pieces of sintering furniture.

19. The method of claim 18 wherein during step (e) the organic binder mixture of said paste mixture substantially burns off.

20. The method of claim 18 wherein in step (b) said paste mixture comprises tungsten and iron, and during step (e) said paste mixture forms an iron-tungsten alloy.

21. The method of claim 18 wherein step (e) comprises heating the joined piece to a eutectic point such that a localized liquid region is formed at an interface of the joined pieces.

22. The method of claim 18 wherein during step (f) the material selected from the group consisting of iron, nickel and cobalt, diffuses into said first and second pieces of sintering furniture forming a solid joint as the localized liquid region decreases its composition of the material thereby becoming more refractory.

23. A method of joining refractory metal components comprising the steps of:
(a) providing a first refractory metal component and a second refractory metal component, said first and second refractory metal components having corresponding surfaces in need of joining;
(b) providing a joining paste mixture comprising a refractory material, a material having a lower melting point than the refractory material selected from the group consisting of iron, nickel and cobalt present in an amount between 0.2 wt. % and 5.0 wt. % based on a total weight of said refractory material and the material having a lower melting point than the refractory material, and a binder mixture;
(c) applying said paste mixture to the surface in need of joining on said first refractory metal component and to the surface in need of joining on said second refractory metal component;
(d) contacting said first refractory metal component to said second refractory metal component at the surfaces in need of joining to form a joined structure;
(e) heating the joined structure to a eutectic point of said paste mixture; and
(f) forming a substantially refractory joint between said first and second refractory metal components.

24. The method of claim 23 wherein step (b) said joining paste mixture comprises said refractory material present in an amount of about 95.0 to about 99.8 wt. %, said material having the lower melting point than the refractory material present in an amount of about 0.2 to about 5.0 wt. % based on a total weight of said refractory material, and said binder mixture.

25. The method of claim 23 wherein in step (a) said refractory metal components comprise molybdenum and in step (b) said refractory material of said paste mixture comprises tungsten.

26. The method of claim 23 wherein in step (a) said refractory metal components comprise molybdenum and in step (b) said refractory material of said paste mixture comprises molybdenum.

27. The method of claim 26 wherein in step (b) the molybdenum has a particle size of about 1.5 to about 3.0 $\mu$m, and the material selected from the group consisting of iron, nickel and cobalt has a particle size wherein at least about 50% of a total number of particles are less than about 3 to about 6 $\mu$m.

28. The method of claim 23 wherein in step (a) said refractory metal components comprise tungsten and in step (b) said refractory material of said paste mixture comprises molybdenum.

29. The method of claim 23 wherein in step (a) said refractory metal components comprise tungsten and in step (b) said refractory material of said paste mixture comprises tungsten.

30. The method of claim 29 wherein in step (b) the tungsten has a particle size of about 0.7 to about 1.5 $\mu$m, and the material selected from the group consisting of iron, nickel and cobalt has a particle size wherein at least about 50% of a total number of particles are less than about 3 to about 6 $\mu$m.

31. The method of claim 23 wherein step (c) comprises applying a layer of said paste mixture to a thickness of about 5 to about 50 $\mu$m.

32. The method of claim 23 wherein during step (e) the material having a lower melting point than the refractory material forms a localized liquid region with the refractory material at the surfaces in need of joining.

33. The method of claim 23 wherein during step (f) the material having a lower melting point than the refractory material diffuses into said refractory metal components forming a solid joint as the localized liquid region decreases its composition of the material having a lower melting point than the refractory material thereby becoming more refractory.

* * * * *

UNITED STATES PATENT AND TRADEMARK OFFICE
CERTIFICATE OF CORRECTION

PATENT NO. : 6,199,747
DATED : March 13, 2001
INVENTOR(S) : Michael A. Cohn et al.

It is certified that error appears in the above-identified patent and that said Letters Patent is hereby corrected as shown below:

Column 8, claim 19,
Line 60, delete "bums" and substitute therefor -- burns --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*